United States Patent [19]

Tabor et al.

[11] Patent Number: 4,950,541
[45] Date of Patent: Aug. 21, 1990

[54] MALEIC ANHYDRIDE GRAFTS OF OLEFIN POLYMERS

[75] Inventors: Ricky L. Tabor, Lake Jackson; Gerald M. Lancaster, Freeport; Zdravko Jezic, Lake Jackson; Gene P. Young, Lake Jackson; John O. Biesser, Lake Jackson, all of Tex.

[73] Assignee: The Dow Chemical Company, Midland, Mich.

[21] Appl. No.: 289,084

[22] Filed: Dec. 22, 1988

Related U.S. Application Data

[63] Continuation-in-part of Ser. No. 836,665, Mar. 5, 1986, abandoned, which is a continuation of Ser. No. 641,087, Aug. 15, 1984, abandoned, and a continuation-in-part of Ser. No. 836,667, Mar. 5, 1986, abandoned, and a continuation-in-part of Ser. No. 835,485, Mar. 3, 1986, abandoned, each is a continuation-in-part of Ser. No. 641,088, Aug. 15, 1984, abandoned, and a continuation-in-part of Ser. No. 229,078, Aug. 5, 1988, Pat. No. 4,927,888, which is a continuation-in-part of Ser. No. 905,099, Sep. 5, 1986, Pat. No. 4,762,890.

[51] Int. Cl.$^5$ ............ D01F 8/06; D01F 8/12; D01F 8/14

[52] U.S. Cl. ............... 428/373; 428/475.8; 428/461; 428/516; 525/74

[58] Field of Search .............................. 428/373

[56] References Cited

U.S. PATENT DOCUMENTS

| | | | |
|---|---|---|---|
| 2,970,129 | 1/1961 | Rugg et al. | 260/45.5 |
| 3,177,269 | 4/1965 | Nowak et al. | 260/878 |
| 3,270,090 | 8/1966 | Nowak | 260/877 |
| 3,658,948 | 4/1972 | McConnell | 260/897 B |
| 3,873,643 | 3/1975 | Wu et al. | 260/878 R |
| 3,882,194 | 5/1975 | Krebaum et al. | 260/878 R |
| 3,886,227 | 5/1975 | VanBrederode et al. | 260/836 |
| 3,968,307 | 7/1976 | Matsui et al. | 428/373 |
| 4,087,587 | 5/1978 | Shida et al. | 260/876 R |
| 4,087,588 | 5/1978 | Shida et al. | 260/876 R |
| 4,230,830 | 10/1980 | Tanny et al. | 525/222 |
| 4,298,712 | 11/1981 | Machonis, Jr. et al. | 260/876 R |
| 4,394,485 | 7/1983 | Adur | 525/74 |
| 4,397,916 | 8/1983 | Nagano | 428/461 |
| 4,424,257 | 1/1984 | Bach | 428/373 |
| 4,440,911 | 4/1984 | Inoue et al. | 525/301 |
| 4,452,942 | 6/1984 | Shida et al. | 525/74 |
| 4,460,632 | 7/1984 | Adur et al. | 428/35 |
| 4,460,745 | 7/1984 | Adur et al. | 525/74 |
| 4,472,555 | 9/1984 | Schmukler et al. | 525/74 |
| 4,477,516 | 10/1984 | Sugihara et al. | 428/296 |
| 4,477,532 | 10/1984 | Schmukler et al. | 428/441 |
| 4,481,262 | 11/1984 | Shida et al. | 428/441 |
| 4,486,469 | 12/1984 | Machonis, Jr. et al. | 427/195 |
| 4,487,885 | 12/1984 | Adur et al. | 525/74 |
| 4,500,384 | 2/1985 | Tomioka et al. | 156/290 |

FOREIGN PATENT DOCUMENTS

| | | | |
|---|---|---|---|
| 0248598 | 12/1987 | European Pat. Off. | |
| 3544523 | 6/1986 | Fed. Rep. of Germany | |
| 50-004144 | 1/1975 | Japan | |
| 54-030929 | 3/1979 | Japan | |
| 1040618 | 2/1989 | Japan | 428/373 |
| 1092477 | 4/1989 | Japan | 428/373 |
| 2081723 | 2/1982 | United Kingdom | |
| 2113696 | 8/1983 | United Kingdom | |
| 2121423 | 12/1983 | United Kingdom | |

Primary Examiner—Carman J. Seccuro
Attorney, Agent, or Firm—W. J. Lee; L. Wayne White

[57] ABSTRACT

Succinic acid or succinic anhydride grafts of linear ethylene polymers are blended with other polymers or resins, e.g. polyesters and the like, to form blends having useful adhesive properties. The adhesive properties are useful in various laminates and in bicomponent fibers which comprise a core of a performance fiber, especially a polyester such as PET or PBT and polyamides, and a sheath of the grafted LDPE, HDPE or LDPE. The succinic acid or succinic anhydride groups are provided by grafting, respectively, maleic acid or maleic anhydride onto the LDPE, LLDPE, and HDPE, especially by a process wherein the grafting is done in a twin-screw, co-rotating extruder with the maleic acid or maleic anhydride being injected into a pressured zone of the extruder. The acid containing grafted polymer is dyeable in contradistinction to ungrafted polymer.

2 Claims, No Drawings

MALEIC ANHYDRIDE GRAFTS OF OLEFIN POLYMERS

FIELD OF THE INVENTION

Grafted olefin polymers, having pendant succinic acid groups, are blended with other polymers and resins.

CROSS-REFERENCE TO RELATED APPLICATIONS

This is a continuation-in-part of application Ser. No. 836,665, filed Mar. 5, 1986, which is a continuation of Ser. No. 641,087, filed Aug. 15, 1984, both now abandoned, and is related to divisional application Ser. No. 825,161, filed Feb. 3, 1986, now U.S. Pat. No. 4,684,576.

It is also a continuation-in-part of pending continuation application Ser. No. 836,667, filed Mar. 5, 1986 and of pending divisional application Ser. No. 835,485, filed Mar. 3, 1986, both of which were filed from Ser. No. 641,088, filed Aug. 15, 1984, all now abandoned.

It is also a continuation-in-part of pending Ser. No. 229,078, filed Aug. 5, 1988 now U.S. Pat. No. 4,927,888 as a continuation-in-part of Ser. No. 905,099, filed Sept. 5, 1986, now U.S. Pat. No. 4,762,890.

The above applications are incorporated herein by reference.

BACKGROUND OF THE INVENTION

Grafting of unsaturated monomer molecules onto olefin polymers and copolymers has been disclosed in a number of patents. The graftings have been used to impart changes in the polymer to which the grafted molecules are attached.

With respect to the invention described and claimed in this application, it is believed that the following patents are representative of the most relevant prior art on grafting of which we are aware: U.S. Pat. Nos. 2,970,129; 3,177,269; 3,270,090; 3,873,643; 3,882,194; 3,886,227; 4,087,587; 4,087,588; 4,239,830; 4,298,712; 4,394,485; 2,081,723; Jap. Kokai 49(1973)-129742.

The principal distinctions between low density polyethylene (LDPE), high density polyethylene (HDPE), and linear low density polyethylene copolymer (LLDPE) are well-known to practitioners of the polyethylene art and are described e.g., in U.S. Pat. No. 4,327,009.

There are, basically, two types of olefin polymerization techniques for preparing high molecular weight olefin polymers and copolymers. The oldest commercial technique involves high pressure, high temperature, and the use of a free radical initiator, such as a peroxide in the polymerization of ethylene; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 gms/cc.

The other commercially-used technique for making polyethylene involves coordination catalysts of the "Ziegler" type or "Phillips" type and includes variations of the Ziegler type, such as the Natta type. These catalysts may be used at very high pressures, but may also (and generally are) used at very low or intermediate pressures. In this technique, other olefins in the range of $C_3$–$C_{12}$ or more can be polymerized and copolymerized into high polymers. The products made by these coordination catalysts are generally known as "linear" polymers because of the substantial absence of branched chains of polymerized monomer units pendant from the main polymer "backbone"; the linear homopolymers of ethylene are also generally known as high density polyethylene (HDPE). Linear polyethylene homopolymer (HDPE) ordinarily has a density in the range of about 0.941 to about 0.965 gms/cc.

In some of the embodiments of the present invention there is used a "linear" type ethylene polymer wherein ethylene has been polymerized along with minor amounts of at least one alpha, beta-ethylenically unsaturated alkene having from 3 to 12 carbons per alkene molecule, preferably 4 to 8. The amount of the alkene comonomer(s) is generally sufficient to cause the density of the polymer to be substantially in the same density range as LDPE, due to the alkyl sidechains on the polymer molecule, yet the polymer remains in the "linear" classification; they are conveniently referred to as "linear low density polyethylene" (LLDPE) copolymers. An acronym for linear medium density ethylene copolymers between LLDPE and HDPE is "LMDPE". An acronym for ultra low density ethylene polymer(s) below the so-called "low" range of densities, is called "ULDPE", and by some practitioners it is known as very low density ethylene copolymer, "VLDPE". Thus, the range of densities of linear polymers can range from below 0.87 gm/cc to over 0.965 gm/cc.

The use of coordination-type catalysts for polymerizing ethylene into homopolymers (which we call "HDPE" polymers) and/or for copolymerizing ethylene with higher alkenes to make copolymers (which are called "LLDPE" copolymers) is disclosed variously in, e.g., U.S. Pat. Nos. 2,699,457; 2,862,917; 2,905,645; 2,846,425; 3,058,963; and 4,076,698.

SUMMARY OF THE INVENTION

Linear ethylene polymers and copolymers known as ULDPE, LLDPE, LMDPE and HDPE having succinic acid or succinic anhydride groups grafted thereon are beneficially blended with other polymers or resins to produce blends having enhanced adhesives and cohesive properties. Furthermore, fibers made of the blends can be blended with other fibers for use as binder fibers, or can be extruded as a thin sheath on a core of a performance fiber so as to provide (or improve) the adhesive properties of the performance fibers. The performance fibers themselves may be prepared from a blend of polymers. The grafted polymers can be dyed.

DETAILED DESCRIPTIONS

The linear ethylene polymers (ULDPE, LLDPE, LMDPE and HDPE) used in making the grafts in the present invention are normally solid, high molecular weight polymers prepared using a coordination-type catalyst in a process wherein ethylene is homopolymerized or copolymerized with at least one higher alkene of $C_3$–$C_{12}$.

The linear copolymer may have a density in the range of about 0.87 g/cc to about 0.965 g/cc. preferably about 0.89 to about 0.95, most preferably about 0.90 g/cc to about 0.94 g/cc. It is evident to practitioners of the relevant arts that the density will depend, in large part, on the particular alkene(s) used as comonomer(s) and on the amount of said alkene(s) incorporated into the copolymer. The alkene(s) copolymerized with ethylene to make LLDPE comprises a minor amount of at least one olefinically unsaturated alkene of from $C_3$–$C_{12}$, most preferably from $C_4$–$C_8$; 1-octene is especially preferred. The amount of said alkene may constitute about 0.5% to about 35% by weight of the copolymer, preferably about 1% to about 20%, most preferably about 2% to about 15%.

It will be understood by practitioners that the expression "linear" olefin polymer includes the entire density range which can be obtained by using a coordination catalyst whether or not a quantity of alkene comonomer is present in the olefin polymer. The density range of linear ethylene polymer is often divided into high, medium, low, and very low (or ultra low). It is generally held that the "high" range is the range which is usually obtained in preparing a homopolyethylene with no comonomer present. The "low" range for linear polymers is generally held to be the equivalent range that is usually obtained in homopolymerizing ethylene using a free-radical initiator at high pressure and high temperature to make LDPE, a branched (non-linear) polymer. The "medium" range for the linear polymers is the range which falls between the usual "high" range for HDPE and the usual "low" range for LDPE. The "ultra low" range for linear polymers is generally taken to be that range which is so high in comonomer content that the density falls below the density range for LDPE. The extent to which the density of the linear polymer is affected by the alkene comonomer is dependent on the length of the alkene; the greater the length of the alkene, the greater the lowering effect on the copolymer for a given molecular amount of alkene.

The linear ethylene polymer may have a melt flow value (MFV) in the range of about 0.1 gm/10 min to about 2000 gm/10 min as measured in accordance with ASTM D-1238(E); condition (E) is also known as (190/2.16). Preferably the melt flow value is in the range of about 0.5 gm/10 min to about 120 gm/10 min, most preferably about 0.7 gm/10 min to about 40 gm/10 min. Practitioners of the relevant arts are aware that the "melt flow value" or "melt flow rate" (also known as "melt index") is inversely related to the molecular weight of the polymer.

Ordinary low density branched polyethylene (LDPE), which may be blended with the grafted linear ethylene polymer or copolymer, is characterized as having a melt flow value in the range of about 0.5 gms/10 min to about 120 gms/10 min according to ASTM D-1238(190/2.16) and a density in the range of about 0.91 g/cc to about 0.935 g/cc, preferably a MFV of about 0.7 gms/10 min to about 40 gms/10 min and a density of about 0.91 to about 0.93 g/cc.

The ratio of grafted polymer/ungrafted ethylene polymer or copolymer should be in the range of about 0.5/99.5 to about 99.5/0.5, preferably about 3/97 to about 50/50.

The maleic acid and maleic anhydride compounds have olefin unsaturation sites conjugated to the acid groups, in contradistinction to the fused ring and bicyclo structures of the non-conjugated unsaturated acids of, e.g., U.S. Pat. Nos. 3,873,643 and 3,882,194 and the like. Fumaric acid, like maleic acid of which it is an isomer, is also conjugated. Fumaric acid, when heated, given off water and rearranges to form maleic anhydride, thus is operable in the present invention.

The grating of the succinic acid or succinic anhydride groups onto ethylene polymers may be done by methods described in the art, which involve reacting maleic acid or maleic anhydride in admixture with heated polymer, generally using a peroxide or free-radical initiator to expedite the grafting. The anhydride or acid groups generally comprise about 0.0001 to about 10 wt. percent, preferably about 0.01 to about 5 wt. percent of the grafted polymer.

Grafting may be effected in the presence of oxygen, air, hydroperoxides, or other free radical initiators, or in the essential absence of these materials when the mixture of monomer and polymer is maintained under high shear in the absence of heat. A convenient method for producing the graft copolymer is the use of extrusion machinery, however, Brabender mixers or Banbury mixers, roll mills and the like may also be used for forming the graft copolymers.

We prefer to employ a twin-screw devolatilizing extruder (such as a Werner-Pfleider twin-screw extruder) wherein maleic acid (or maleic anhydride) is mixed and reacted with the LLDPE at molten temperatures, thereby producing and extruding the grafted polymer. Most preferably, for the purposes of the present invention, the maleic acid or anhydride is injected into the extruder in a pressured portion as in U.S. Pat. No. 4,762,890 thereby obtaining less yellowness than if injected in a non-pressurized portion of the extruder. The so-produced grafted polymer is then appropriately mixed with linear or branched polymers to produce the desired blends.

The following described methods and tests are used in testing the polymers and blends in many of the following examples.

MOLDING OF TEST SPECIMENS

On a 9"×6" compression molder having two platens set at 350° F. (177° C.) and two platens water cooled, is molded a 25 mil (0.635 mm) plaque of the material to be tested for adhesion. An appropriate amount of material to be molded is placed in the 25 mil mold between two sheets of Mylar film ("Mylar" is a DuPont tradename for polyethyleneterphthalate, a.k.a. "PET"), which, in turn is between two metal plates (support plates). The support plates containing the resin and mold are placed between the 177° C. platens of the compression molder and the platens are closed and allowed to heat with no pressure for one minute. (At the 177° C. temperature the Mylar film is not melted and serves as a mold release film.)

After the one minute time period, 10,000 lbs. platen pressure are applied for one minute. The support plates containing the mold and polymer are then removed and placed in the water cooled section for one minute. The Mylar film is removed and the polymer may be cut from the mold using a razor blade against a clean, hard surface.

ADHERING TEST SPECIMEN TO SUBSTRATE

The molded specimen (9"×6") is placed against a substrate (at least 9"×6") with a Mylar film tab (3"×9") centered in transverse manner between the test specimen and substrate, leaving about 1.5" of the tab protruding from each side of the so-formed "sandwich". Then a Mylar film (12"×12") is placed on each side of the specimen/substrate sandwich and a steel support plate and placed against each of the Mylar films. The sandwich structure described above is placed between the hot (177° C.) platens of a compression molder and pressed immediately to 10,000 psi and held there for two minutes. (At 177° C., the PET is not melted and does not stick to the grafted polymer.) After this, the sandwich is removed from the hot platens and placed between the cool platens for two minutes. The sandwich is removed from the press and the Mylar film is removed from each side of the polymer/substrate laminate.

The laminate is then cut into 5 equal 1" wide strips by cutting longitudinally. Each of five test strips are slightly peeled back by hand, then are mounted (clamped) in the Instron tensile tester. The Instron is run at a pulling rate of 2"/min at a free hanging peel angle and the tensile force is recorded on a strip chart until about 2-3 inches have been peeled. The average of the five peels is taken as the adhesion in pounds per inch.

The following examples are provided as illustrations of various embodiments, but the invention is not limited to the particular embodiments shown.

DESCRIPTION OF SUBSTRATES

Electrolytic chromium coated steel had a thickness of 6 mils (0.1524 mm); this steel was chosen due to its popular use in polyolefin applications.

The aluminum which is used below is coiled aluminum 5 mils thick, 18" wide, grade 3003-H14.

The copper which is used below is copper sheet 110 alloy, fully annealed, 99% pure, 5 mils thick.

The nylon-6 used below is a film 5 mils thick and 20 inches wide.

The oriented polypropylene (OPP) used below is a film grade 1 mil thick and 6 inches wide.

The polypropylene film used below is 5 mils thick, 6 inches wide.

EXAMPLE 1

(Blend of grafted HDPE with, respectively, LDPE, LLDPE and ungrafted HDPE for comparison purposes)

A HDPE homopolymer (the "base" polymer), melt flow value (MFV) of about 0.83 g/10 min (ASTM D-1238(E)) and density of 0.965 g/cc, is extruded with maleic anhydride (3.0 phr) and dicumyl peroxide (0.3 phr) at an average melt temperature of 225° C. (range about 180°-250° C.) using a Werner-Pfleiderer twin-screw devolitization extruder. The final incorporated concentration of maleic anhydride is 0.5% by weight (as determined by titration) and has a MFV of about 0.5 gm/10 min; that is called the MAH-grafted HDPE.

Using a 6-inch Farrell two-roll mill, 250 gm samples are blended having compositions ranging from 5% MAH-grafted HDPE to 50% MAH-grafted HDPE in LLDPE in various HDPE resins, and in LDPE, at a melt temperature of 170° C. The blends are adhered to a variety of substrates and tested for adhesion by the methods described supra. The results are displayed in Tables I-II, where adhesion is given in lbs/in.

TABLE I

| | ADHESION OF BLENDS OF MAH-GRAFTED HDPE WITH HDPE | | | | | |
|---|---|---|---|---|---|---|
| Blend | Steel | Copper | Alum | Nylon | OPP | PP |
| Control, 100% HDPE* | 0.19 | 0.00 | 0.00 | 0.04 | 0.71 | 1.58 |
| 10% MAH-Grafted HDPE | 12.5 | 0.67 | 0.77 | 8.6 | >1.53 | 0.18 |
| 20% MAH-Grafted HDPE | 14.8 | 1.56 | 1.79 | 4.58 | 1.33 | 1.12 |
| 40% MAH-Grafted HDPE | 16.7 | 0.86 | 2.18 | 1.54 | 1.5 | 1.17 |

TABLE I-continued

| | ADHESION OF BLENDS OF MAH-GRAFTED HDPE WITH HDPE | | | | | |
|---|---|---|---|---|---|---|
| Blend | Steel | Copper | Alum | Nylon | OPP | PP |
| Control, 100% MAH-Grafted HDPE | 18.9 | 1.0 | 9.3 | 0.3 | 1.4 | 0.9 |

*0.83 MFV, 0.9658 density

TABLE II

| | ADHESION OF BLENDS OF MAH-GRAFTED HDPE WITH LLDPE | | | | | |
|---|---|---|---|---|---|---|
| Blend | Steel | Copper | Alum | Nylon | OPP | PP |
| Control, 100% LLDPE* | 0.17 | 0.0 | 0.0 | 0.25 | 1.44 | 0.32 |
| 10% MAH-Grafted HDPE | 12.0 | 5.0 | 6.9 | 16.8 | 0.8 | 0.12 |
| 20% MAH-Grafted HDPE | >36.0 | 8.1 | 14.2 | 13.6 | 1.03 | 0.15 |
| 40% MAH-Grafted HDPE | 32.2 | 7.0 | 14.7 | 6.8 | 1.21 | 0.17 |
| Control, 100% MAH-Grafted HDPE | 18.9 | 1.0 | 9.3 | 0.3 | 1.4 | 0.9 |

*7% 1-octene, 5.98 MFV, 0.918 density

EXAMPLE 2

An LLDPE ethylene/1-octene copolymer (6% 1-octene, 1.1 MFV, 0.925 g/cc density) is extruded with maleic anhydride (1.0 phr) and dicumyl peroxide (0.2 phr) at an average melt temperature of 225° C. (range about 180° to 250° C.) using a Werner-Pfleiderer twin screw devolatilizing extruder. The maleic anhydride and peroxide are added in a solution of methyl ethyl ketone (500 gm MAH/500 ml of MEK/25 gm dicumyl peroxide) at a flow rate of 14.4 ml/min into the extruder. The LLDPE is fed into the extruder at a rate of 50 lbs/hr.

The final incorporation of succinic anhydride groups in the polymer is 0.5% as determined by titration. Using a procedure similar to that described in Example 1 above, blends are made using a two-roll mill (Farrell, 6-inch) ranging from 5% to 80% by weight of MAH-grafted LLDPE in HDPE, LDPE, and LLDPE polymers. The HDPE is an ethylene homopolymer of 5.34 gm/10 min MFV and 0.964 g/cc density. The LLDPE is an ethylene/1-octene copolymer of 7% 1-octene, 4.9 gm/10 min. MFV, and 0.922 gm/cc density. The LDPE is an ethylene homopolymer of 5.54 gm/10 min MFV and 0.923 gm/cc density. The adhesion testing, in accordance with the method described hereinbefore, are in Table III, IV, and V. In the Tables all adhesion values are in lbs/in.

TABLE III

| | ADHESION OF MAH-GRAFTED HDPE BLENDED WITH HDPE | | | | |
|---|---|---|---|---|---|
| Blend | Steel | Copper | Alum | OPP | PP |
| Control, 100% HDPE* | 0 | 0 | 0 | 0.89 | 1.85 |
| 5% MAH-Grafted HDPE | 0 | 0.15 | 0 | 1.35 | 1.02 |
| 10% MAH-Grafted HDPE | 0.43 | 0.32 | 0.00 | 1.14 | 0.87 |
| 20% MAH-Grafted HDPE, | 20.0 | 0.78 | 4.49 | 0.93 | 0.68 |
| Control, 100% MAH- | 18.9 | 1.00 | 9.30 | 1.40 | 0.90 |

TABLE III-continued
ADHESION OF
MAH-GRAFTED HDPE BLENDED WITH HDPE

| Blend | Steel | Copper | Alum | OPP | PP |
|---|---|---|---|---|---|
| Grafted HDPE | | | | | |

*5.15 MFV, 0.965 density

TABLE IV
ADHESION OF
MAH-GRAFTED HDPE BLENDED WITH LDPE

| Blend | Steel | Copper | Alum | OPP | PP |
|---|---|---|---|---|---|
| Control, 100% LDPE* | 0 | 0 | 0 | 0.06 | 0.04 |
| 5% MAH-Grafted HDPE | 17.6 | 1.88 | 15.84 | 0.05 | 0.03 |
| 10% MAH-Grafter HDPE | 10.28 | 2.10 | 7.32 | 0.05 | 0.05 |
| 20% MAH-Grafted HDPE | 4.56 | 2.70 | 4.11 | 0.08 | 0.60 |
| 50% MAH-Grafted HDPE | 8.0 | 2.41 | 7.49 | 0.13 | 0.13 |
| Control, 100% MAH-Grafted HDPE | 18.9 | 1.00 | 9.30 | 1.40 | 0.90 |

*5.87 MFV, 0.923 density

TABLE V
ADHESION OF
MAH-GRAFTED HDPE BLENDED WITH LLDPE

| Blend | Steel | Copper | Alum | OPP | PP |
|---|---|---|---|---|---|
| Control, 100% LLDPE* | 0 | 0 | 0 | 0.32 | 0.14 |
| 5% MAH-Grafted HDPE | 3.10 | 0.93 | 0.75 | 0.41 | 0.12 |
| 10% MAH-Grafted HDPE | 24.58 | 3.92 | 6.44 | 0.34 | 0.85 |
| 20% MAH-Grafted HDPE | 26.48 | 5.80 | 17.78 | 0.27 | 0.10 |
| 50% MAH-Grafted HDPE | 26.00 | 3.10 | 13.24 | 0.33 | 0.18 |
| Control, 100% MAH-Grafted HDPE | 18.9 | 1.00 | 9.30 | 1.40 | 0.90 |

*24 MFV, 0.921 density, 10% 1-octene

EXAMPLE 2

(Blend of grafted LLDPE with, respectively, LLDPE and HDPE for comparison purposes)

An LLDPE ethylene/1-octene copolymer (the "base" polymer), containing about 7% of copolymerized 1-octene, melt flow value (MFV) of about 4.42 g/10 min (ASTM D-1238(E)) and density of 0.922 g/cc, is extruded with maleic anhydride (1.9 phr) and dicumyl peroxide (0.2 phr) at an average melt temperature of 225° C. (range about 180°–250° C.) using a Werner-Pfleiderer twin-screw devolitization extruder. The maleic anhydride and peroxide are added in the form of a concentrate in an LLDPE copolymer (7% 1-octene, 25 g/10 min. MFV, 0.921 g/cc density) at concentrations of 10 phr maleic anhydride and 1 phr of dicumyl peroxide, as compounded on a Banbury mixer. This concentrate is fed into the hopper section at a rate of 16.2 lbs/hr while the base polymer is fed into the same hopper at a rate of 63 lbs/hr. The final incorporated concentration of maleic anhydride is 0.6% by weight (as determined by titration) and has a MFV of 1.25 gm/10 min; this is called the MAH-grafted LLDPE.

Using a 6-inch Farrell two-roll mill, 250 gm samples are blended having compositions ranging from 5% MAH-grafted LLDPE to 50% MAH-grafted LLDPE in ungrafted LLDPE (7% 1-octene, 4.42 MFV, 0.922 g/cc) and in HDPE (4.65 MFV, 0.965 g/cc), at a melt temperature of 170° C. The blends are adhered to a variety of substrates and tested for adhesion by the methods described supra. The results are displayed in Table VI and Table VII, where adhesion is given in lbs/in.

From the data in Table VI it is seen that the blending of the MAH-grafted LLDPE with LLDPE improved the adhesion to all the substrates and, in most cases, the blend gave better adhesive than the MAH-grafted LLDPE control itself. From the data in Table VII it is seen that the HDPE (unblended control) had virtually no adhesion to steel, copper, aluminum, and Nylon-6, but when blended with the MAH-grafted LLDPE it exhibited a significant and useful degree of adhesiveness. However, in Table VII, it is evident that there is less tendency for the blend to exhibit greater adhesion than MAH-grafted LLDPE control itself.

TABLE VII
ADHESION OF BLENDS OF MAH-GRAFTED LLDPE WITH HDPE

| Blend | Steel | Copper | Alum | Nylon |
|---|---|---|---|---|
| Control, 100% HDPE* | 0.0 | 0.0 | 0.0 | 0.0 |
| 5% MAH-Grafted LLDPE | 0.2 | 0.2 | 0.2 | 0.3 |
| 10% MAH-Grafted LLDPE | 0.5 | 0.5 | 0.4 | 0.9 |
| 20% MAH-Grafted LLDPE | 1.3 | 0.5 | 1.1 | 0.2 |
| 50% MAH-Grafted LLDPE | 10.2 | 1.4 | 8.4 | 0.1 |
| Control, 100% MAH-Grafted LLDPE | 18.0 | 8.0 | 12.9 | 0.5 |

*24 MFV, 0.921 density, 10% 1-octene

TABLE VI
ADHESION OF BLENDS OF MAH-GRAFTED LLDPE WITH LLDPE

| Blend | Steel | Copper | Alum | Nylon |
|---|---|---|---|---|
| Control, 100% LLDPE* | 0.4 | 0.2 | 0.3 | 0.7 |
| 5% MAH-Grafted LLDPE | >28.7 | 4.1 | 5.3 | 2.3 |
| 10% MAH-Grafted LLDPE | 13.8 | 7.5 | 10.6 | 0.1 |
| 20% MAH-Grafted LLDPE | 13.5 | 6.5 | 11.3 | 0.8 |
| 50% MAH-Grafted HDPE | 21.0 | 4.9 | 26.0 | 0.5 |
| Control, 100% MAH-Grafted HDPE | 18.0 | 8.0 | 12.9 | 0.5 |

*24 MFV, 0.921 density, 10% 1-octene

EXAMPLE 3

An LLDPE ethylene/1-octene copolymer (6% 1-octene, 1.1 MFV, 0.925 g/cc density) is extruded with maleic anhydride (1.0 phr) and dicumyl peroxide (0.2 phr) at an average melt temperature of 225° C. (range about 180° to 250° C.) using a Werner-Pfleiderer twin screw devolatilizing extruder. The maleic anhydride and peroxide are added in a solution of methyl ethyl ketone (500 gm MAH/500 ml of MEK/25 gm dicumyl peroxide) at a flow rate of 14.4 ml/min into the extruder. The LLDPE is fed into the extruder at a rate of 50 lbs/hr.

The final incorporation of succinic anhydride groups in the polymer is 0.5% as determined by tiltration. Using a procedure similar to that described in Example 2 above, blends are made using a two-roll mill (Farrell, 6-inch) ranging from 5% to 80% by weight of MAH-grafted LLDPE in HDPE, LDPE, and LLDPE polymers. The HDPE is an ethylene homopolymer of 5.34 gm/10 min MFV and 0.964 g/cc density. The LLDPE is an ethylene/1-octene copolymer of 7% 1-octene, 4.9 gm/10 min. MFV, and 0.922 gm/cc density. The LDPE is an ethylene homopolymer of 5.54 gm/10 min MFV and 0.923 gm/cc density. The adhesion testing, in accordance with the method described hereinbefore, are in Table VIII, and IX. In the Tables all adhesion values are in lbs/in. (1 lb/in=175.1268 N/m).

TABLE VIII
ADHESION OF MAH-GRAFTED LLDPE BLENDED WITH LLDPE

| Blend | Steel | Copper | Alum | Nylon | OPP | PP |
|---|---|---|---|---|---|---|
| Control, 100% LLDPE* | 0 | 0 | 0 | 0.02 | 0.50 | 0.28 |
| 5% MAH-Grafted LLDPE | 0.83 | 0.60 | 0.29 | 1.89 | 0.42 | 0.18 |
| 10% MAH-Grafted LLDPE | >26.6 | 1.86 | 2.13 | 8.00 | 0.82 | 0.16 |
| 20% MAH-Grafted LLDPE | >31.7 | 4.55 | 6.1 | 6.61 | 0.87 | 0.14 |
| 50% MAH-Grafted LLDPE | 25.1 | 3.45 | 6.7 | 2.39 | 0.87 | 0.15 |
| 80% MAH-Grafted LLDPE | 21.0 | 3.29 | 5.71 | 0.99 | 1.04 | 0.18 |
| Control, 100% MAH-Grafted LLDPE | 18.5 | 2.86 | 4.88 | 1.33 | — | 0.24 |

*LLDPE of 7% 1-octene; MFV 4.9; 0.922 g/cc density.

TABLE IX
ADHESION OF MAH-GRAFTED LLDPE BLENDED WITH LDPE

| Blend | Steel | Copper | Alum | Nylon | OPP | PP |
|---|---|---|---|---|---|---|
| Control, 100% LDPE* | 0 | 0 | 0 | 0.04 | 0.09 | 0.04 |
| 5% MAH-Grafted LLDPE | 7.6 | 1.49 | 4.8 | 2.41 | 0.83 | 0.04 |
| 10% MAH-Grafted LLDPE | 8.8 | 1.80 | 5.1 | 2.61 | 0.07 | 0.04 |
| 20% MAH-Grafted LLDPE | ≈27.1 | 2.04 | 5.48 | 2.36 | 0.23 | 0.07 |
| 50% MAH-Grafted LLDPE | ≈38.3 | 3.68 | 8.18 | 1.36 | 0.58 | 0.16 |
| 80% MAH-Grafted LLDPE | 26.0 | 1.73 | 5.54 | 1.09 | 0.72 | 0.18 |
| Control, 100% MAH-Grafted LLDPE | 18.5 | 2.86 | 4.88 | 1.33 | — | 0.24 |

*24 MFV, 0.921 density, 10% 1-octene

The MAH-grafted linear polymers and copolymers are useful alone in many applications wherein their adhesion properties and their strength properties offer an advantage to the user and are also useful as a blend component in improving the adhesion properties of other polymers, especially polyolefins such as ungrafted ULDPE, LLDPE, LMDPE, HDPE, and LDPE, and the like and are particularly useful as a blend component for improving the adhesive properties of other polymers, such as PET, polyamide, polypropylene and the like. The polymers and blends of the present invention are useful for extrusion coating of articles, such as metals, polymer films, paper, wood, or glass, and as adhesive or barrier layers in multilayer films, as adhesive layers in packaging, as laminate adhesives, as hot melt coatings or adhesives, as wire and cable interlayers, for coating strands of wire or polymer fibers, such as in the making of biocomponent fibers and in other applications where the thermoplasticity, the processability, the tenacity and/or the adhesiveness is utilized.

The grafted linear polymers as described above are beneficially employed in the making of fibers and/or the encapsulation of other fibers. Blends of, e.g., grafted LLDPE and grafted HDPE with other polymers are made into fibers which have good bondability and dyeability. Furthermore, the grafted polymers can be extruded as a thin sheath on a core fiber of some other polymer such as ungrafted LLDPE, ungrafted HDPE, polypropylene, polyamide, and the like. Of special preference in this disclosure is the spinning of bicomponent fibers which have a core of a polyester, such as polyethylene terephthalate (PET) or polybuylene terephtyhalate (PBT), covered with a sheath of a grafted linear polymer, such as LLDPEg or HDPEg, or a polymer blend which contains such grafted linear polymer. Bicomponent fibers have been made, e.g., by coating graft PE onto polyethylene as in Japan Kokai Pat. No. 54/030,927 published Mar. 7, 1979.

When coating a sheath of a polymer blend containing graft linear polymer onto a core of polyester, such as PET, or a core of a polymer blend which contains such polyester, it is often best to employ an intensive mixer to maintain a good dispersion of the minor-ingredient(s) (discontinuous phase) of the blend in the major-ingredient (continuous matrix) of the blend, the molten blend passing directly from the intensive mixer to, and through, the die. Such an intensive mixer is disclosed, for example, in German Patent DE No. 35 44 523 A1.

Other polyesters, e.g. polycarbonates, are considered to be within the scope of the fiber core materials in this disclosure.

In producing the bicomponent fibers having PET or PBT as the core around which the grafted linear polymer (or a polymer blend containing same) is extruded as a sheath, one should bear in mind that typical commercial PET metals at about 250° C. unless modified with an ingredient which lowers the softening point. The melting point of highly crystalline PET is about 270° C. The softening/melting point of PBT usually depends on its degree of crystallization and can range from a pressure deflection temperature at about 162° C. to above about 225° C. Thus, the core of the fiber will solidify at a higher temperature than the grafted linear polymer or a blend which contains the linear polymer.

By having a sheath of the bondable LLDPEg or HDPEg, the polyester fibers can be more efficiently used in non-wovens and the like where enhanced bonding of fibers is beneficial or otherwise desirable.

Another advantage of using the grafted ethylene polymer as a component or constituent in a fiber arrangement is found in its dyeability. By having dyeable fibers, it becomes possible in many instances to avoid having to add color pigments to the polymers prior to fabricating the polymer into fibers or other end products.

The following data illustrate certain embodiments of the presently claimed invention, but the invention is not limited to the particular embodiments illustrated.

EXAMPLE 4

(to illustrate binder fibers)

25 parts by weight of LLDPE (18 MFV, 0.930 density) having about 1% succinic acid groups grafted thereon are spun into fibers and are then blended with 75 parts by weight PET fibers. A fiber bat of the blend is heat-bonded in an oven at 320° F., the bat is cut into 1-inch strips and pulled on an Instron. The bat samples are found to be well-bonded.

EXAMPLE 5

(to illustrate coextrusion with PET)

LLDPE (18 MFV, 0.930 density) is grafted with maleic acid anhydride to provide succinic acid groups along the polymer chain. Portions of the LLDPEg is then blended with amounts of ungrafted LLDPE (18 MFV, 0.920 density) to produce blends containing 0.05%, 0.1%, 0.15%, 0.2%, and 0.4% of the succinic acid. The LLDPEg samples are coextruded with PET to produce side-by-side bicomponent fibrous material which, in cross-section, is PET enclosed in LLDPEg blend. The adhesion between fibers in a heat-bonded bat of the fibrous material is appreciably better than that obtained in comparison by using the same LLDPE without any grafted acid groups.

EXAMPLE 6

(illustrate dyeability by comparative data)

LLDPE (18 MFV, 0.920 density) does not accept dye when treated with Crystal Violet III (a basic dye) at 80° F. for 15 minutes in the presence of didecyl dimethyl ammonium chloride (a wetting agent). When blended with enough LLDPEg to provide a blend having about 0.15% by weight succinic acid groups, the same LLDPE, when treated in the same manner as immediately above, became dyed to a blue/purple color.

What is claimed is:

1. A bicomponent fiber comprising a core of a polyester or polyamide and a sheath of grafted linear ethylene polymer having succinic acid or succinic anhydride groups grafted thereon, said sheath covering or encapsulating said core.

2. The fiber of claim 1 wherein the core is polyethylene terephthalate.

3. The fiber of claim 1 wherein the core is polybutylene terephthalate.

4. The fiber of claim 1 wherein the sheath of grafted linear ethylene polymer comprises at least one of ULDPE, LLDPE, LMDPE, or HDPE.

5. The fiber of claim 1 wherein the sheath of grafted linear ethylene polymer comprises ULDPE.

6. The fiber of claim 1 wherein the sheath of grafted linear ethylene polymer comprises LLDPE.

7. The fiber of claim 1 wherein the sheath of grafted linear ethylene comprises LMDPE.

8. The fiber of claim 1 wherein the sheath of grafted linear ethylene polymer comprises HDPE.

9. The fiber of claim 1 wherein the sheath is blend of grafted HDPE and ungrafted LLDPE.

10. The fiber of claim 1 wherein the sheath is either LLDPEg or HDPEg blended with a polyolefin other than either LLDPE or HDPE.

11. The fiber of claim 1 wherein the sheath is either LLDPEg or HDPEg blended with LDPE or PP.

12. The fiber of claim 1 wherein the core is PET or PBT containing fiber-enhancing modifiers.

* * * * *

UNITED STATES PATENT AND TRADEMARK OFFICE
CERTIFICATE OF CORRECTION

PATENT NO. : 4,950,541

DATED : August 21, 1990

INVENTOR(S) : Tabor et al

Page 1 of 2

It is certified that error appears in the above-identified patent and that said Letters Patent is hereby corrected as shown below:

Title page item [57] change "grafted LDPE, HDPE" to read --grafted LLDPE, HDPE--.

Cover page, line 51; change "2 Claims" to read --12 Claims--.

Col. 3, line 66; change "The grating of" to read --The grafting of--.

Col. 5, line 49; change "min; that is" to read --min; this is--.

Col. 7, line 17; change "Grafter HDPE" to read --Grafted HDPE--.

Col. 7, line 43; change "EXAMPLE 2" to read --EXAMPLE 2A--.

Col. 8, line 1; change "4,42 MFV," to read --4.42 MFV,--.

Col. 8, line 11; change "better adhesive than" to read --better adhesion than--.

Col. 9, line 46; change "≈27.1" to read -->27.1--.

Col. 9, line 48; change "≈38.3" to read -->38.3--.

Col. 9, line 57; change "adhesion properties" to read --adhesive properties--.

Col. 9, line 59; change "the adhesion" to read --the adhesive--.

Col. 10, line 4; change "making of biocomponent" to read --making of bicomponent--.

Col. 10, line 19; change "or polybuylene" to read --or polybutylene--.

UNITED STATES PATENT AND TRADEMARK OFFICE
CERTIFICATE OF CORRECTION

PATENT NO.  : 4,950,541

DATED       : August 21, 1990

INVENTOR(S) : Tabor et al.

It is certified that error appears in the above-identified patent and that said Letters Patent is hereby corrected as shown below:

Col. 10, line 19; change "terephtyha-" to read--terephtha---.

Col. 10, line 23; change "by coating graft" to read--by coating grafted--.

Col. 10, line 26; change "54/030,927" to read --54/030,929--.

Col. 10, line 28; change "graft linear" to read--grafted linear--.

Col. 10, line 45; change "PET metals at" to read--PET melts at--.

Col. 11, line 19; change "MFV, 0.920" to read--MFV, 0.930--.

Col. 11, line 32; change "MFV, 0.920" to read--MFV, 0.930--

Signed and Sealed this

Second Day of March, 1993

Attest:

STEPHEN G. KUNIN

*Attesting Officer*    *Acting Commissioner of Patents and Trademarks*